US009304739B1

(12) United States Patent
Juffa

(10) Patent No.: US 9,304,739 B1
(45) Date of Patent: Apr. 5, 2016

(54) OPTIMIZED 3D LIGHTING COMPUTATIONS USING A LOGARITHMIC NUMBER SYSTEM

(75) Inventor: Norbert Juffa, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1509 days.

(21) Appl. No.: 11/609,273

(22) Filed: Dec. 11, 2006

(51) Int. Cl.
*G06F 7/483* (2006.01)
*G06T 15/00* (2011.01)

(52) U.S. Cl.
CPC ............ *G06F 7/4833* (2013.01); *G06T 15/005* (2013.01); *G06T 2210/32* (2013.01)

(58) Field of Classification Search
USPC .......................... 708/200, 204, 277, 512, 517; 345/418–419, 426, 501–522; 8/200, 8/204, 277, 512
See application file for complete search history.

(56) References Cited

U.S. PATENT DOCUMENTS

| | | | | | |
|---|---|---|---|---|---|
| 4,700,319 | A | * | 10/1987 | Steiner ........................ | 708/521 |
| 4,720,809 | A | * | 1/1988 | Taylor .......................... | 708/512 |
| 5,703,801 | A | * | 12/1997 | Pan et al. ..................... | 708/517 |
| 5,990,894 | A | * | 11/1999 | Hu et al. ...................... | 345/418 |
| 6,128,638 | A | * | 10/2000 | Thomas ....................... | 708/606 |
| 6,249,857 | B1 | * | 6/2001 | Klapman et al. ............. | 712/34 |
| 6,559,856 | B1 | * | 5/2003 | Fossum et al. ............... | 345/600 |
| 7,139,005 | B2 | * | 11/2006 | Wang et al. .................. | 345/643 |
| 2006/0161704 | A1 | * | 7/2006 | Nystad et al. ................ | 710/105 |

FOREIGN PATENT DOCUMENTS

GB          2351577    *   1/2001    ................ G06F 1/03

OTHER PUBLICATIONS

K. Yoshida, T. Sakamoto and T. Hase, "A 3D graphics library for 32-bit microprocessors for embedded systems", IEEE Trans. Consum. Electron., vol. 44, No. 4, pp. 1107-1114, 1998.*

J.-H. Sohn, et al., "Optimization of portable system architecture for real-time 3-D graphics", Proc. IEEE Int. Symp. Circuits and Systems, pp. I769 -I772, 2002.*

B.-G. Nam M.-W. Lee and H.-J. Yoo, "Development of a 3-D graphics rendering engine with lighting acceleration for handheld multimedia systems", IEEE Trans. Consum. Electron., vol. 51, No. 3, pp. 1020-1027, 2005.*

G. K. Kolli, "3-D Graphics optimizations for ARM architecture", Game Developers Conf., 2002.*

(Continued)

*Primary Examiner* — Andrew Caldwell
*Assistant Examiner* — Matthew Sandifer
(74) *Attorney, Agent, or Firm* — Artegis Law Group, LLP

(57) ABSTRACT

Embodiments of the present invention set forth a technique for optimizing the performance and efficiency of complex, software-based computations, such as lighting computations. Data entering a graphics application programming interface (API) in a conventional arithmetic representation, such as floating-point or fixed-point, is converted to an internal logarithmic representation for greater computational efficiency. Lighting computations are then performed using logarithmic space arithmetic routines that, on average, execute more efficiently than similar routines performed in a native floating-point format. The lighting computation results, represented as logarithmic space numbers, are converted back to floating-point numbers before being transmitted to a graphics processing unit (GPU) for further processing. Because of efficiencies of logarithmic space arithmetic, performance improvements may be realized relative to prior art approaches to performing software-based floating-point operations.

17 Claims, 4 Drawing Sheets

(56) References Cited

OTHER PUBLICATIONS

D. Harris, "A Powering Unit for an OpenGL Lighting Engine," Proc. 35th Asilomar Conf. Signals, Systems, and Computers, pp. 1641-1645, 2001.*

Eggers, et al. "Simultaneous Multithreading: A Platform for Next-Generation Processors," IEEE Micro, vol. 17, No. 5, pp. 12-19, Sep./Oct. 1997.

Albert D. Edgar et al., "FOCUS Microcomputer Number System", CACM vol. 22., No. 3, Mar. 1979, pp. 166-177.

Kingsbury et al., "Digital Filtering Using Logarithmic Arithmetic", Electronics Letters, vol. 7, No. 2, Jan. 28, 1971, pp. 56-58.

Kim et al., "A 231 MHz, 2.18mW 32-bit Logarithmic Arithmetic Unit for Fixed-Point 3D Graphics System", IEEE 2005, 0/7803-9162-4/05, pp. 305-308, http://ssl.kaist.ac.kr/2007/data/conference/HJKIM_ASSCC2005.pdf.

* cited by examiner

OPTIMIZED 3D LIGHTING COMPUTATIONS USING A LOGARITHMIC NUMBER SYSTEM

BACKGROUND OF THE INVENTION

1. Field of the Invention

Embodiments of the present invention generally relate to computer graphics and, more specifically, to optimized 3D lighting computations using a logarithmic number system.

2. Description of the Related Art

Three-dimensional (3D) graphics systems are typically architected around a graphics pipeline that includes computational infrastructure designed to respond to commands received through an application programming interface (API) layer. A graphics application generates commands and passes the commands through the API layer using a set of predefined function calls, also known as "API calls," to invoke specific functionality defined by the API. The implementation details of this functionality are generally opaque to the application and may include software, hardware or a mix of both hardware and software. The API calls generated by the graphics application are configured to adhere to the API specification requirements, including the specific data structures and data types that the application passes to the API when invoking the different API calls. Many APIs specify data values in one or more conventional arithmetic types. Conventional arithmetic types include standard 32-bit floating-point, 32-bit fixed-point and 32-bit integer. Longer and shorter variations thereof are also conventional arithmetic types. For example, a 16-bit fixed-point type and a 64-bit floating-point type are both conventional arithmetic types. The API calls related to lighting computation are commonly invoked using one or more conventional arithmetic types.

Generally, lighting computations occur early in the graphics pipeline. Lighting computations are also one of the most computationally expensive stages within the graphics pipeline. Certain high-end graphics processing units (GPUs) include the lighting computation portion of the graphics pipeline. However, many low-cost or low-power GPUs do not include this functionality and instead rely on the host central processing unit (CPU) to perform lighting computations. When performing lighting computations, the CPU typically executes floating-point math instructions such as division, reciprocal and square root using a hardware-based floating-point unit, if such a unit is included in the CPU. However, in many low-power mobile computing devices, such as cell phones and personal data assistants (PDAs), the host CPU does not include a hardware-based floating-point unit since these units are relatively expensive CPU resources. Instead, CPUs found in mobile computing devices more commonly include only an integer math unit, which is typically not configured to perform division, reciprocal and square root operations.

Without floating-point math hardware, a software-based math library is used to support conventional arithmetic data types within the math functions used by the lighting computation stage of the graphics pipeline. The operating system, the compiler, or the API layer may supply the software-based math library. The software-based math library is built from a set of integer math instructions provided in hardware by the CPU's integer math unit. Dozens of integer math instructions are typically executed to complete certain types of conventional arithmetic math operations. For example, using integer-based software that is optimized for the well-known ARM™ instruction set, approximately 55 integer instructions are executed to perform a single floating-point addition or subtraction operation. Similarly, approximately 90 integer instructions are executed to perform a single floating-point division operation. The overall performance of the graphics pipeline is therefore substantially reduced in systems that need to perform complex computations, such as lighting computations, but do not have a dedicated floating-point unit in hardware.

One solution to the performance reduction associated with software-based floating-point math is to use fixed-point integer math instead. However, many APIs specify a dynamic range that is much wider than the range that fixed-point math can easily accommodate. For example, the 3D graphics glue layer for Java™, commonly referred to as JSR-184, requires that certain key lighting computations (including normal transforms) be performed in an arithmetic that provides a dynamic range of $2^{-64}$ to $2^{63}$, with 16 bits of precision. In addition, the API corresponding to JSR-184 specifies that applications deliver data to the 3D graphics software in the well-known 32-bit IEEE-754 single precision floating-point format. Such constraints make implementing a fixed-point arithmetic that satisfies the JSR-184 requirements largely impractical. Certain applications substantially utilize the full dynamic range and may generate visual artifacts if the dynamic range is not supported in the underlying arithmetic functionality.

As the foregoing illustrates, what is needed in the art is an improved arithmetic system for performing software-based conventional arithmetic operations that can be effectively implemented in computing devices, such as mobile computing devices, that do not have a hardware-based floating-point unit in the host processor.

SUMMARY OF THE INVENTION

One embodiment of the invention sets forth a computing device configured to perform conventional arithmetic operations. The computing device includes a host processing unit coupled to a host memory, wherein the host processing unit does not have a hardware-based floating-point unit; and an application programming interface configured to receive conventional arithmetic data from an application executing on the host processing unit, convert the conventional arithmetic data to a logarithmic representation to produce logarithmic data, perform a set of operations on the logarithmic data to produce processed logarithmic data, and convert the processed logarithmic data to conventional arithmetic data to produce processed conventional arithmetic data.

One advantage of the disclosed computing device is that the efficiencies of logarithmic space arithmetic enable performance improvements relative to prior art systems configured to perform software-based conventional arithmetic operations. Thus, the disclosed application programming interface may be effectively implemented in computing devices, such as mobile computing devices, that typically do not have a hardware-based floating-point unit in the host processor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
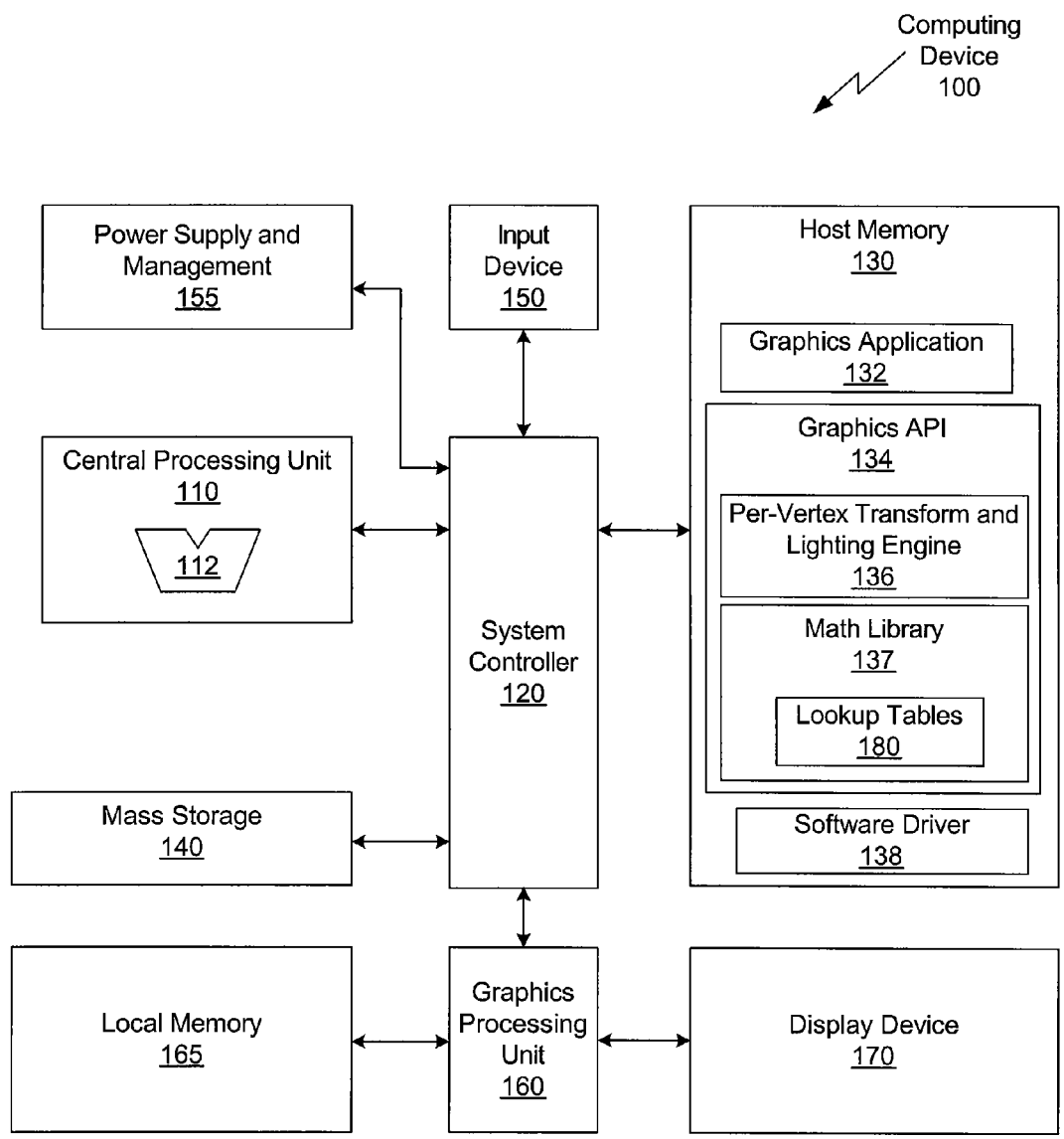
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a system controller 120 that bridges communication between a CPU 110, a host memory 130, a mass storage device 140, a GPU 160, an input device 150 and a power supply and management subsystem 155. The GPU 160 is coupled to a local memory 165 and a display device 170. Persons skilled in the art will recognize that the two or more system components of the computing device 100 may be integrated into a single device. Thus, the exemplary architecture of the computing device 100 in no way limits the scope of the present invention.

The CPU 110 executes programming instructions for management and application functions within the computing device 100. The CPU 110 includes an arithmetic logic unit (ALU) 112 that performs mathematical and logical computations on one or more input values, where each value includes a fixed number of bits, such as 32 bits. While integer arithmetic functions are included in the ALU 112, the resources needed to perform hardware-based floating-point arithmetic functions, including addition, multiplication, division, reciprocals and square roots are relatively expensive and, therefore, are not included in the ALU 112. Consequently, the ALU 112 may directly perform integer addition on two 32-bit integer input values to yield a 32-bit integer output value. However, floating-point addition on two 32-bit floating-point values or any division or square root operation is performed using software that guides a sequence of potentially dozens of integer arithmetic operations within the ALU 112 to yield a 32-bit floating-point output value.

The host memory 130 stores a set of software modules that include, without limitation, a graphics application 132, a graphics API 134, a per-vertex transform and lighting engine 136, a math library 137 and a software driver 138. The graphics application 132 provides a specific user experience, including visual content and interactive behavior. The graphics application 132 generates and transmits a stream of commands to the graphics API 134 using a predefined set of API calls. The predefined API calls are configured to expect numerical values in a conventional arithmetic type for data associated with lighting. Again, conventional arithmetic types include floating-point and fixed-point numbers. The graphics API 134 processes the API calls through the per-vertex transform and lighting engine 136. The per-vertex transform and lighting engine 136 performs a set of well-known graphics computations referred to as "per-vertex operations," which includes certain vertex transforms and lighting computation. The per-vertex transform and lighting engine 136 performs, among other things, a set of computationally intensive lighting computations.

In prior art systems, the per-vertex transform and lighting engine 136 operates on the conventional arithmetic type data using a software library of math routines, incurring the inefficiencies inherent in certain conventional arithmetic type math described previously herein. The present invention introduces a math library 137 of arithmetic routines that operate in logarithmic space rather than conventional arithmetic spaces. The math library 137 may include a set of lookup tables 180 used to perform certain functional computations, including, without limitation, addition and subtraction. As is well-known, logarithmic arithmetic is frequently more efficient than conventional arithmetic for an equivalent dynamic range and precision. Lighting computations are particularly rich in division, reciprocal, square root and reciprocal square root operations, which are particularly efficient to perform using logarithmic arithmetic and particularly inefficient in conventional arithmetic. The per-vertex transform and lighting engine 136 benefits from the greater efficiency of logarithmic space arithmetic by calling on the logarithmic space arithmetic functions within the math library 137 to perform lighting computations and other similarly complex operations. One major benefit is the average computational speedup realized by performing the lighting computations in logarithmic arithmetic. As described in greater detail below in FIGS. 2-3, the graphics API 134 converts the numeric values included in incoming API calls from the conventional arithmetic type representation specified in the API interface to a logarithmic arithmetic type representation used within the per-vertex transform and lighting engine 136. The graphics API 134 also converts the logarithmic arithmetic type results from the per-vertex transform and lighting engine 136 back to the specified conventional arithmetic representation before presenting the results to the software driver 138, which then transmits the results to the GPU 160.

The GPU 160 receives graphics data generated by the per-vertex transform and lighting engine 136 and performs further graphics operations. For example, the GPU 160 may perform, without limitation, rasterization, per-fragment operations, texturing, shading and frame-buffer management. The GPU 160 stores relevant data in the local memory 165 such as completed frames, textures and shading programs. The display device 170 displays graphics data and may be built using an LCD or other appropriate display technology.

The mass storage 140 provides non-volatile storage of operating system images, applications and user data. The mass storage 140 may be implemented using any technically appropriate technology, such as a hard disk drive or flash memory. The input device 150 may include, without limitation, a keyboard, mouse, capacitive scratch pad, buttons or joystick and allows the user to interact with the graphics application 132. The power supply and management subsystem 155 provides the computing device 100 with "DC-DC" power conversion and other common power management services, such as battery charging, gas gauging and per-subsystem power switching.

Figure 2:
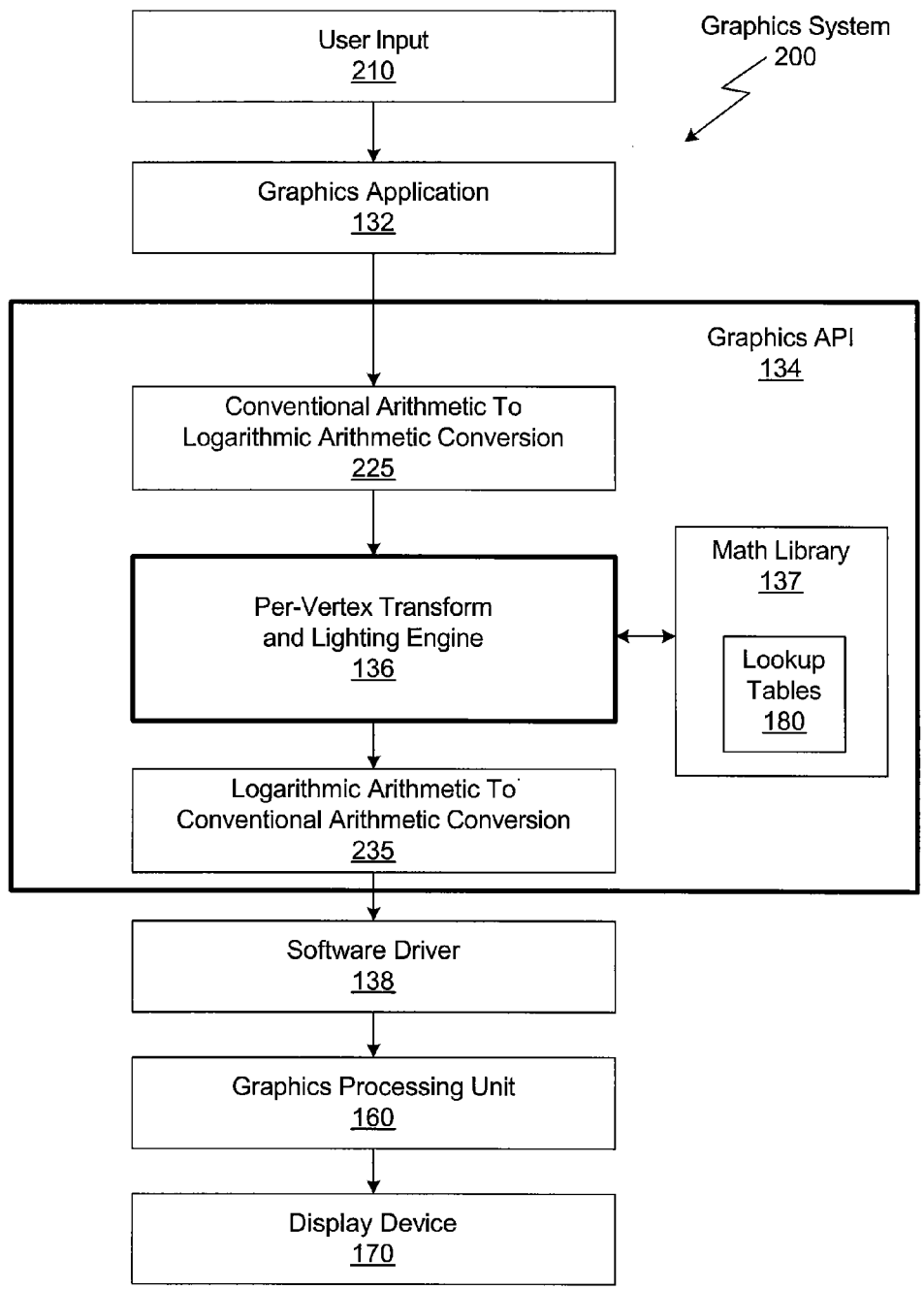
FIG. 2 is a conceptual illustration of a graphics system using logarithmic math, according to one embodiment of the present invention.

FIG. 2 is a conceptual illustration of a graphics system 200 configured to perform logarithmic math, according to one embodiment of the present invention. User input 210, such as key strokes or joystick position, is gathered by the input device 150 within the computing device 100 and presented to the graphics application 132. The graphics application 132 processes the user input according to a set of behavioral logic and generates a stream of commands that are transmitted to the graphics API 134.

The graphics API 134 receives the stream of commands, which includes values represented in a conventional arithmetic format. A conventional arithmetic to logarithmic arithmetic conversion software routine 225 converts the conventional arithmetic values within the stream of commands to logarithmic space values and passes the converted command stream to the per-vertex transform and lighting engine 136. The per-vertex transform and lighting engine 136 process the stream of commands according to well-known graphics equations using math library 137. Importantly, however, the arithmetic associated with the lighting computation is conducted in logarithmic space. Therefore, the output of the per-vertex transform and lighting engine 136 is represented in logarithmic space. This logarithmic space data is subsequently converted to a conventional arithmetic format by the logarithmic arithmetic to conventional arithmetic conversion routine 235. The resulting conventional arithmetic data is transmitted to the software driver 138, which transfers this conventional arithmetic data to the GPU 160. The GPU 160 processes the conventional arithmetic data to generate graphics frames, which are displayed on the display device 170.

Figure 3:
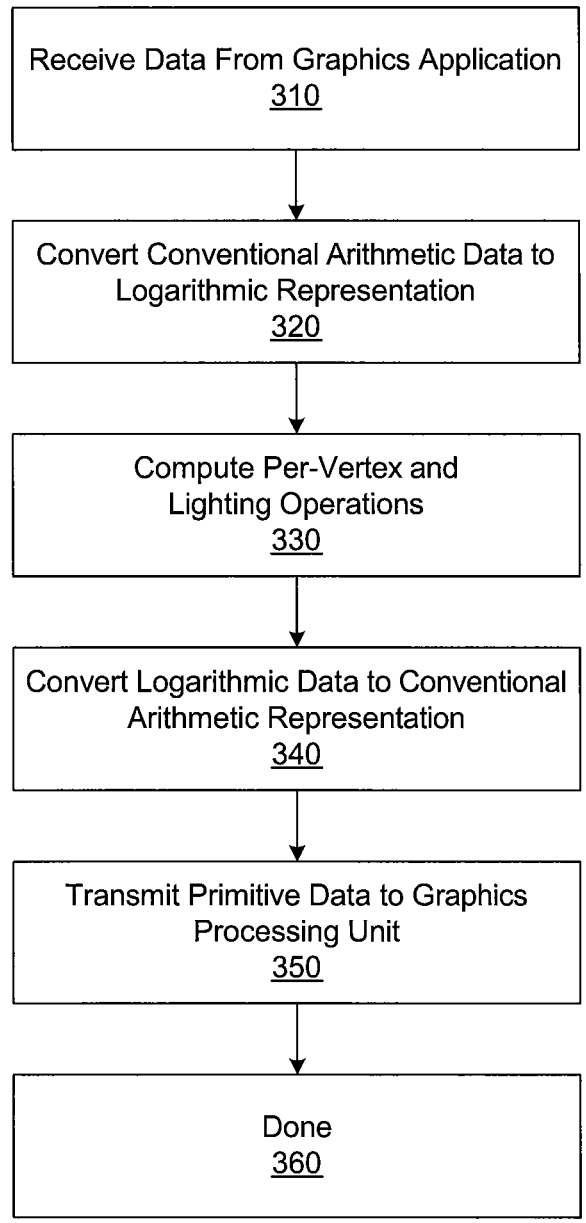
FIG. 3 is a flow diagram of method steps for an application programming interface to receive and process per-vertex and lighting information using logarithmic math, according to one embodiment of the present invention.

FIG. 3 is a flow diagram of method steps for an application programming interface to receive and process per-vertex and lighting information using logarithmic math, according to one embodiment of the present invention. Although the method steps are described in conjunction with the graphics API 134 of FIG. 1, persons skilled in the art will understand that any entity or element within computing device 100, whether implemented in software, hardware or both, that performs the method steps, in any order, is within the scope of the invention.

The method for receiving and computing per-vertex information using logarithmic math begins in step 310, where the graphics API 134 receives conventional arithmetic data from the graphics application 132. In step 320, the conventional arithmetic to logarithmic arithmetic conversion routine 225 within the graphic API 134 converts the conventional arithmetic data to the equivalent logarithmic representation of the same data. In step 330, per-vertex transform and lighting operations are conducted using logarithmic space arithmetic. Again, the computations are performed by the per-vertex transform and lighting engine 136. The output of step 330 includes graphics primitives that include numeric values represented in logarithmic space. In step 340, the logarithmic space data resulting from step 330 is converted by the logarithmic arithmetic to conventional arithmetic conversion routine 235 within the graphics API 134 to the corresponding conventional arithmetic representation of the same data. In step 350, the conventional arithmetic primitive data from step 340 is transmitted to the software driver 138, which, in turn, transmits the data to the GPU 160. The method terminates in step 360.

Figure 4:
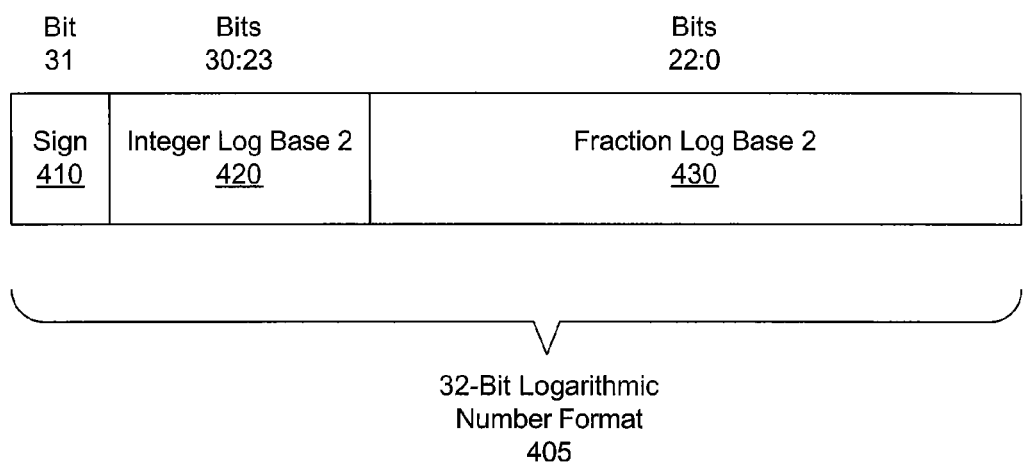
FIG. 4 is a conceptual illustration of a 32-bit logarithmic number format, according to one embodiment of the present invention.

FIG. 4 is a conceptual illustration of a 32-bit logarithmic number format 405, according to one embodiment of the present invention. The 32-bit logarithmic number format 405 includes a sign bit 410, an 8-bit integer logarithmic base two value 420 and a 23-bit fractional logarithmic base two value 430. The integer logarithmic base two value 420 ("int") and a fractional logarithmic base two value 430 ("frac") are concatenated to form a single fixed-point number, with an implied bias ("bias"), that is used in the following equation to represent a numeric value: numeric_value=$2^{((int-bias)+(frac/2^{24}))}$. In one embodiment, the bias is 128, which results in a balanced number of positive and negative exponent values. Since the encoded value represents a logarithm based 2, negative exponents correspond to values with magnitudes less than one (<1.0) and positive exponents correspond to values with magnitudes of greater than one (>1.0). An exponent of exactly zero corresponds to a value of exactly one (1.0).

In the logarithmic number system, multiplication and squaring are performed by adding two working integer with fraction values. Reciprocals are computed by negation of the working integer with fraction. Division is performed by subtracting one working integer with fraction (the denominator) from another integer with fraction (the numerator). The square root function is performed with a right shift operation on the working integer with fraction value. The reciprocal square root function is performed with a right shift operation on the working integer with fraction value followed by a negation. Addition and subtraction of logarithmic space numbers is more complex. A preferred embodiment uses known techniques of quadratic interpolation using tabulated function values, stored as one or more lookup tables within the set of lookup tables 180 of FIG. 1, to perform addition and subtraction directly within logarithmic space.

Manipulating logarithmic space numbers is well-known and many different techniques, such as those described above, currently exist for performing logarithmic math operations. For example, a general discussion of logarithmic arithmetic systems may be found in the following reference: Albert D. Edgar and Samuel C. Lee, "FOCUS Microcomputer Number System," Communications of the ACM, vol. 22, Issue 3 (March 1979), p. 166-177.

In sum, software computations performed within the lighting portion of the standard graphics pipeline are performed using logarithmic space arithmetic to achieve an average performance improvement relative to performing the identical computations using software-based conventional arithmetic functions. Data entering the API in conventional arithmetic format is first converted to logarithmic format. Then, within the API, arithmetically intensive computations, such as lighting computations, are performed using a set of logarithmic space arithmetic routines for addition, subtraction, multiplication and division operations as well as others, such as power and square root operations. Since these logarithmic space arithmetic routines are computationally more efficient than corresponding conventional arithmetic routines significant performance gains may be achieved relative to prior art approaches.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense.

I claim:

1. A method for performing conventional arithmetic operations in a system having a host processor that does not have a hardware-based floating-point unit, the method comprising:

receiving conventional floating-point arithmetic data from an application;

converting, via a floating-point arithmetic to logarithmic arithmetic conversion software routine included in an application programming interface (API), the conventional floating-point arithmetic data to a logarithmic representation to produce logarithmic data;

performing, via a graphics module included in the API, a set of lighting computations on the logarithmic data to produce processed logarithmic data;

converting, via a logarithmic arithmetic to floating-point arithmetic conversion software routine included in the API, the processed logarithmic data to conventional floating-point arithmetic data to produce processed conventional floating-point arithmetic data; and transmitting the processed conventional floating-point arithmetic data to a software driver that is configured to prepare the data for processing by a second processing unit.

2. The method of claim 1, wherein the application is a graphics application.

3. The method of claim 1, further including the step of transmitting the processed conventional floating-point arithmetic data to the second processing unit for further processing.

4. The method of claim 3, wherein the second processing unit is a graphics processing unit.

5. A non-transitory computer-readable medium including a set of instructions that, when executed by a host processor that does not have a floating-point unit, causes a computing device to conduct conventional floating-point arithmetic operations by performing the steps of:

receiving conventional floating-point arithmetic data from an application;

converting, via a floating-point arithmetic to logarithmic arithmetic conversion software routine included in an application programming interface (API), the conventional floating-point arithmetic data to a logarithmic representation to produce logarithmic data;

performing, via a graphics module included in the API, a set of lighting computations on the logarithmic data to produce processed logarithmic data;

converting, via a logarithmic arithmetic to floating-point arithmetic conversion software routine included in the API, the processed logarithmic data to conventional floating-point arithmetic data to produce processed conventional floating-point arithmetic data; and transmitting the processed conventional floating-point arithmetic data to a software driver that is configured to prepare the data for processing by a second processing unit.

6. The non-transitory computer readable medium of claim 5, wherein the application is a graphics application.

7. The non-transitory computer readable medium of claim 5, further including the step of transmitting the processed conventional floating-point arithmetic data to a second processing unit for further processing.

8. The non-transitory computer readable medium of claim 7, wherein the second processing unit is a graphics processing unit.

9. A computing device configured to perform conventional arithmetic operations, the computing device comprising:

a host processing unit coupled to a host memory, wherein the host processing unit does not have a hardware-based floating-point unit; and an application programming interface configured to:
receive conventional floating-point arithmetic data from an application executing on the host processing unit,
convert, via a floating-point arithmetic to logarithmic arithmetic conversion software routine included in the application programming interface, the conventional floating-point arithmetic data to a logarithmic representation to produce logarithmic data,
perform a set of lighting computations on the logarithmic data to produce processed logarithmic data, and
convert, via a logarithmic arithmetic to floating-point arithmetic conversion software routine included in the application programming interface, the processed logarithmic data to conventional floating-point arithmetic data to produce processed conventional floating-point arithmetic data.

10. The computing device of claim 9, further comprising a software driver, and wherein the application programming interface is further configured to transmit the processed conventional floating-point arithmetic data to a software driver.

11. The computing device of claim 10, further comprising a second processing unit, and wherein the software driver is configured to transmit the processed conventional floating-point arithmetic data to a second processing unit for further processing.

12. The computing device of claim 11, wherein the second processing unit is a graphics processing unit.

13. The computing device of claim 9, wherein the application is a graphics application.

14. The computing device of claim 13, wherein the application programming interface further includes a per-vertex transform and lighting engine to perform the set of lighting computations on the logarithmic data to produce the processed logarithmic data.

15. The computing device of claim 14, wherein the per-vertex transform and lighting engine includes a set of per-vertex transform and lighting operations for performing the set of lighting computations on the logarithmic data to produce the processed logarithmic data, and the set of per-vertex transform and lighting operations are able to access a math library within the application programming interface when performing the set of lighting computations on the logarithmic data.

16. The computing device of claim 15, wherein the math library includes at least one lookup table for performing logarithmic space addition or subtraction operations.

17. The computing device of claim 9, wherein the computing device is a mobile computing device.

* * * * *